United States Patent [19]
Martz et al.

[11] Patent Number: 6,088,439
[45] Date of Patent: Jul. 11, 2000

[54] SYSTEM FOR CONNECTING CALLS ON PHYSICALLY DISTINCT SERVERS ON AN ADVANCED INTELLIGENT NETWORK

[75] Inventors: Basia Maria Martz, Wheaton; Dennis Frederick Meyer, Naperville, both of Ill.

[73] Assignee: Lucent Technologies Inc., Murray Hill, N.J.

[21] Appl. No.: 08/898,266

[22] Filed: Jul. 22, 1997

[51] Int. Cl.[7] .................................................. H04M 7/00
[52] U.S. Cl. ........................... 379/230; 379/220; 379/229
[58] Field of Search .................................. 379/201, 207, 379/219, 229, 230

[56] References Cited

U.S. PATENT DOCUMENTS

| | | | |
|---|---|---|---|
| 5,450,488 | 9/1995 | Pugaczewski et al. ................ | 379/67.1 |
| 5,469,500 | 11/1995 | Satter et al. ............................ | 379/201 |
| 5,511,111 | 4/1996 | Serbetcioglue et al. ............... | 379/88.1 |
| 5,555,299 | 9/1996 | Maloney et al. ....................... | 379/212 |
| 5,680,437 | 10/1997 | Segal ..................................... | 379/10 |
| 5,696,815 | 12/1997 | Smyk .................................... | 379/142 |
| 5,701,412 | 12/1997 | Takeda et al. ......................... | 379/201 |
| 5,712,903 | 1/1998 | Bartholomew et al. ............. | 379/88.25 |
| 5,724,409 | 3/1998 | Malik et al. ......................... | 379/88.19 |
| 5,740,237 | 4/1998 | Malik et al. ............................ | 379/211 |
| 5,754,546 | 5/1998 | Voit et al. .............................. | 370/384 |
| 5,778,056 | 7/1998 | Ely et al. ............................... | 379/207 |
| 5,805,587 | 9/1998 | Norris et al. .......................... | 370/352 |
| 5,809,128 | 9/1998 | McMullin .............................. | 379/215 |
| 5,848,142 | 12/1998 | Yaker .................................... | 379/215 |
| 5,867,498 | 2/1999 | Gillman et al. ....................... | 370/385 |

OTHER PUBLICATIONS

Harry Newton, Newton's Telecom Dictionary, ISBN 1–57820–023–7, p. 391, Mar. 1998.

*Primary Examiner*—Krista Zele
*Assistant Examiner*—Roland G. Foster
*Attorney, Agent, or Firm*—Dennis J. Williamson; Werner Ulrich

[57] ABSTRACT

A bridge connection is made between interfaces on physically distinct telecommunication servers such that the two ends of the bridge can be used to connect existing calls that are terminated on each of the servers. To provide the bridge connection, a call using a standard outgoing T1 trunk on one of the servers is made through the public switched telephone network (PSTN) to an incoming T1 trunk on the other server. The servers reserve a special directory number for such calls. When a bridge connection is required one of the servers is queried for its special directory number. The other server is then instructed to make a call to that number. When the called server recognizes the incoming call as using its special number, it answers the call. The calling server then outpulses information needed by the called server to associate the bridge connection with the pending action. In this manner, calls terminating on distinct servers can be connected without the need for additional hardware.

9 Claims, 3 Drawing Sheets

SYSTEM FOR CONNECTING CALLS ON PHYSICALLY DISTINCT SERVERS ON AN ADVANCED INTELLIGENT NETWORK

BACKGROUND OF THE INVENTION

The invention relates, generally, to Advanced Intelligent Network (AIN) systems and, more particularly, to a method and apparatus for connecting calls on physically distinct telecommunications servers.

It will be understood that AIN systems are used to provide enhanced voice and data network services. A typical AIN architecture distributes service logic, data and service assistance functions throughout the telecommunications network. AIN networks provide enhanced services such as voice mail, single number reach, speech recognition, call screening and the like. Typically, a call requiring enhanced services provided by the AIN activates a trigger in a central office switching system. Such triggers can be initiated when a caller goes off-hook, or according to dialing plans such as office dialing plans, individualized dialing plans, dialed feature codes or the like. Many other trigger types are available such as those used on trunk facilities or the feature buttons based on ISDN-telephone sets. Once a trigger has been set, the call setting that trigger is connected to the AIN system where appropriate call processing occurs based on the trigger and possible additional information provided by the calling party. Typically, the call is connected to a service control unit that consists of a control computer, a fault tolerant switch fabric unit and a plurality of service circuits connected to the switch fabric. The service circuits provide the AIN service capabilities such as voice announcements, dual-tone multifrequency (DTMF) receivers, text-to-speech conversion, speech recognition, mail boxes and the like. The switch fabric unit physically connects a calling party to one of the service circuits or to another party, as necessary to provide the appropriate AIN service.

In the typical AIN architecture, a call is routed to the service control unit from a switching system as a result of the activation of a trigger (for example, the dialed directory number, call forward on busy, or the like). The control information for the call is sent to the control computer which determines the service to be performed and instructs the switch fabric unit to sequentially connect the call to one or more service circuits as appropriate for the applicable service. After the requested service has been performed the call is either completed or returned to the originating switching system.

The switch fabric units typically consist of a digital switch fabric with fully duplicated time slot interchangers such as the switch fabric of a 5ESS® switching system manufactured and sold by Lucent Technologies Inc. While such switch fabrics are extremely robust, they are also relatively expensive. Moreover, because such switch fabrics are designed to handle the traffic of a network switching system, they are not scaleable to meet the varying traffic demands of an AIN.

As a result, an AIN has been developed that replaces the switch fabric unit with a plurality of physically distinct telecommunication servers consisting of personal computers having standard computer telephony hardware and interfaces. The telecommunication servers perform the routing function of the switch fabric units but are less expensive, scaleable and ultimately provide greater capacity than the switch fabric units. One problem with such distributed systems is that calls terminating at different servers cannot be connected when the need arises because the servers operate relatively independently in providing AIN service. To eliminate this problem, the prior art uses a separate switch fabric located in front of the servers or dedicated physical interfaces between the servers to handle inter-server connections. In either of these scenarios additional hardware is required resulting in wasted resources, higher costs, lower reliability and lower capacity.

Thus, a system for connecting calls on physically distinct servers in an AIN is desired.

SUMMARY OF THE INVENTION

The system of the invention makes a bridge connection between interfaces on physically distinct telecommunication servers such that the two ends of the bridge can be used to connect existing calls that are terminated on each of the servers. To provide the bridge connection, a call using a standard outgoing T1 trunk on one of the servers is made through the public switched telephone network (PSTN) to an incoming T1 trunk on the other server. The servers reserve a special directory number for such calls. When a bridge connection is required one of the servers is queried for its special directory number. The other server is then instructed to make a call to that number. When the called server recognizes the incoming call as using its special number, it answers the call. The calling server then outpulses information needed by the called server to associate the bridge connection with the pending action. In this manner, calls terminating on distinct servers can be connected without the need for additional hardware.

DETAILED DESCRIPTION OF THE INVENTION

Figure 1:
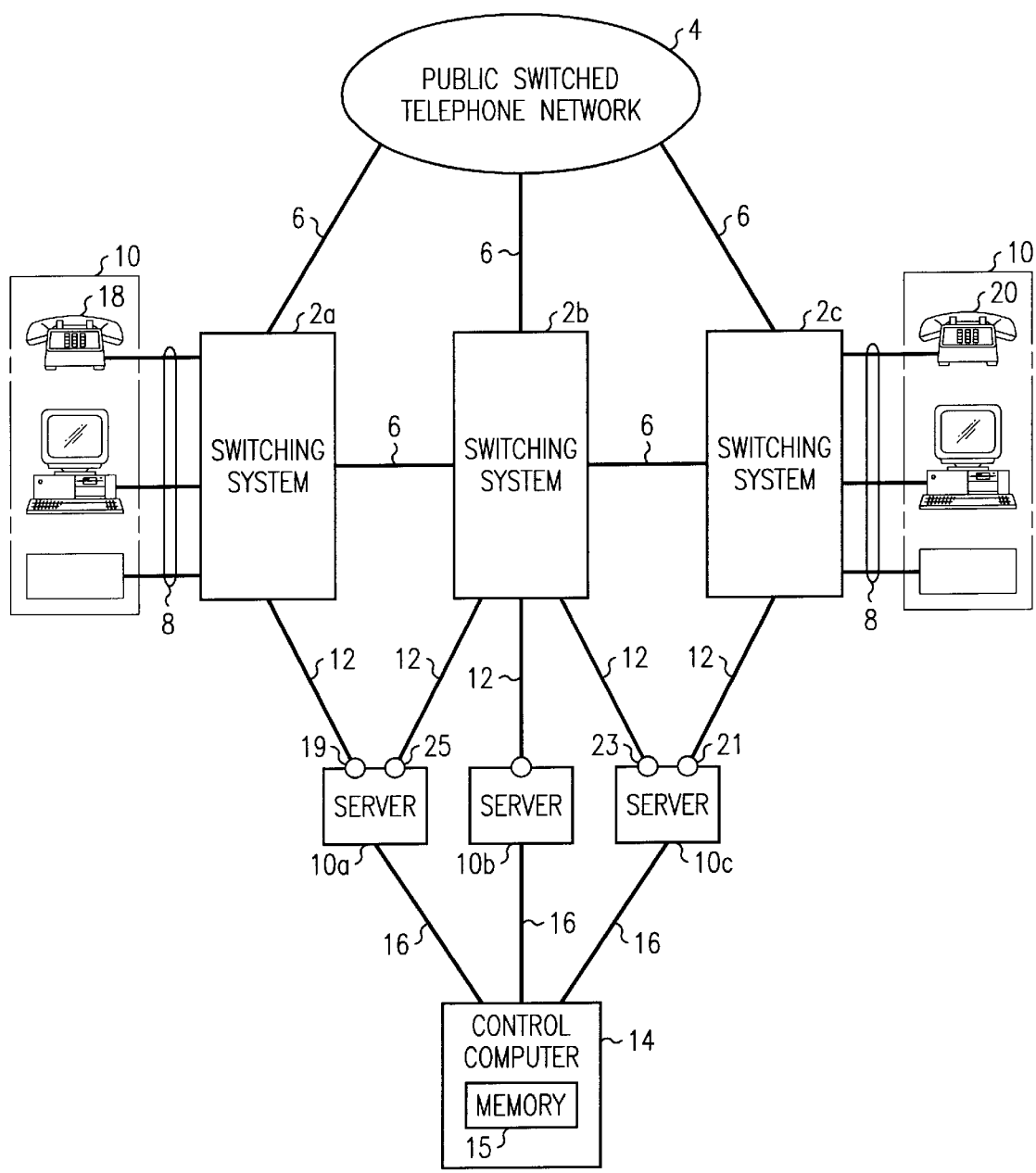
FIG. 1 is a block diagram of an AIN network architecture in which the system of the invention can be used.

Referring more particularly to FIG. 1, an exemplary network architecture in which the system of the invention is used is shown consisting of a number of switching systems 2a, 2b and 2c connected to one another and to other switches in the public switched telephone network (PSTN) 4 over interoffice trunking 6. The switching systems can consist of the 5ESS® switching system manufactured and sold by Lucent Technologies Inc. or any similar switch. Certain of the switching systems, known as central office switching systems, also host customer premise equipment (CPE) 10 such as telephones, personal computers, facsimile machines or the like over customer lines 8.

To provide the AIN services a plurality of telecommunication servers 10a, 10b and 10c are connected to selected ones of the switching systems 2 via T1 trunk 12. Note that not all servers are connected to all switching systems and some switching systems may not be connected to any AIN servers. Telecommunication servers 10a–10c can be personal computers based on P5 or P6 processors manufactured and sold by Intel Corporation or other similar processors and include standard computer telephony hardware for answering and processing AIN telephone calls as is known in the art. A control computer 14 having memory 15 is connected to each of the servers 10a–10c over data links 16, a connection over an industry standard local area network such as ethernet or the like. It will be appreciated that while a specific configuration of the architecture is illustrated, the specific AIN architecture can vary provided that distributed call processing is provided using multiple telecommunication servers. It will further be appreciated that a typical AIN can include other elements such as service management systems, service control points and the like that are not shown and are not specifically involved in the system of the invention.

As previously explained, AIN provides enhanced customer services such as voice mail, single number reach, speech recognition services and the like. In operation, when a call is received at a switching system provided with an AIN services platform and that call sets an AIN trigger, the call is connected to one of the servers handling AIN calls for that switching system over a T1 trunk 12. The server processes the call and provides the appropriate enhanced service as is known in the art. When a normal telephone call comes into a server, the server informs a wellknown process on the control computer that the server has a call for a particular directory number (DN X). The control computer, upon receipt of the call information, determines the service to be performed for calls for DN X. The service is identified by a 5-digit service identification number, and a reply is sent from the control computer to the server indicating that call should be sent to service identification number Y. The server then sends a message to process S on the control computer informing the control computer that it has a new call on port N for DN X, and that this call has been assigned call identification number C. The call identification number is assigned from a range of 10-digit numbers assigned to the server by the control computer upon initialization of the server.

The service logic then initiates a new call instance. Each call can be executing multiple activities concurrently; for example, it can be playing a voice file to the caller while concurrently listening for DTMF digits or voice commands with Automatic Speech Recognition circuits. Each activity is assigned a 10 digit action identification number, so that events related to the activity (such as caller's speech recognized as a 'YES') can be sent to the right instance of the activity. According to the system of the invention, one of these activities is "make a bridge call from server X to server Y" which initiates the system of the invention.

In certain situations calls can be received on two different servers where the calls must be connected. One situation illustrating this scenario will now be described. Assume that customer A initiates a call from telephone 18 where the purpose of the call is to obtain messages from customer A's voice mail. Switching system 2a connects telephone 18 to server 10a over T1 trunk 12 where server 10a connects telephone 18 to customer A's voice mail. At the time the connection is made, server 10a informs control computer 14 of the port 19 on server 10a that is hosting the call as previously described. While customer A is accessing his or her voice mail, caller B attempts to contact customer A from telephone 20 where customer A has single number reach service. Note, in this scenario caller B need not be a customer of AIN as the trigger is a call attempt to customer A from any caller. Single number reach service is a service by which the AIN will sequentially "ring" each of customer A's communication devices upon caller B's dialing of a single directory number. Typically, a first device such as the customer's home telephone is rung, if there is no answer, a second device such as a mobile phone is rung, and if there is no answer, a third device such as a page is activated. The customer devices to be rung and the attempt sequence typically can be designated by the customer. Because single number reach is performed in the AIN, caller B's call is routed to server 10c. Again at the time the connection is made, server 10c informs control computer 14 of the port 21 on server 10c that is hosting the call. Thus, customer A at telephone 18 is connected to server 10a and caller B at telephone 20 is connected to server 10c. Because caller B is attempting to reach customer A, it would be desirable to be able to connect telephone 18 to telephone 20. However, because server 10a and server 10c are physically distinct network elements that typically operate independently of one another, they do not have information or facilities necessary to create a connection between caller B's telephone 20 and customer A's telephone 18. It will be appreciated that call scenarios other than that described above can result in the need for inter-server connections.

Figure 2A:
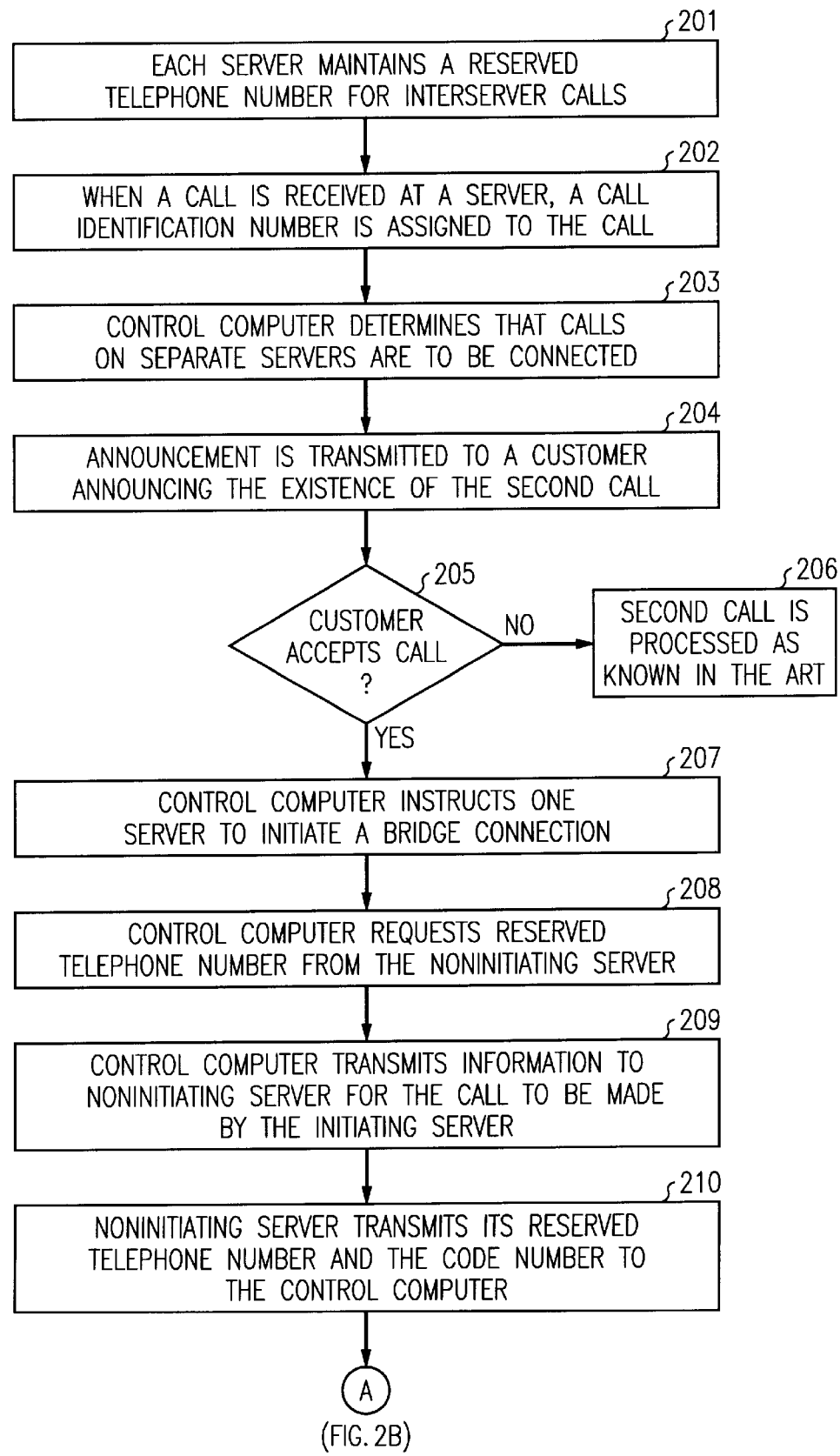
FIG. 2 is a flow chart illustrating the operation of the system of the invention.
Figure 2B:
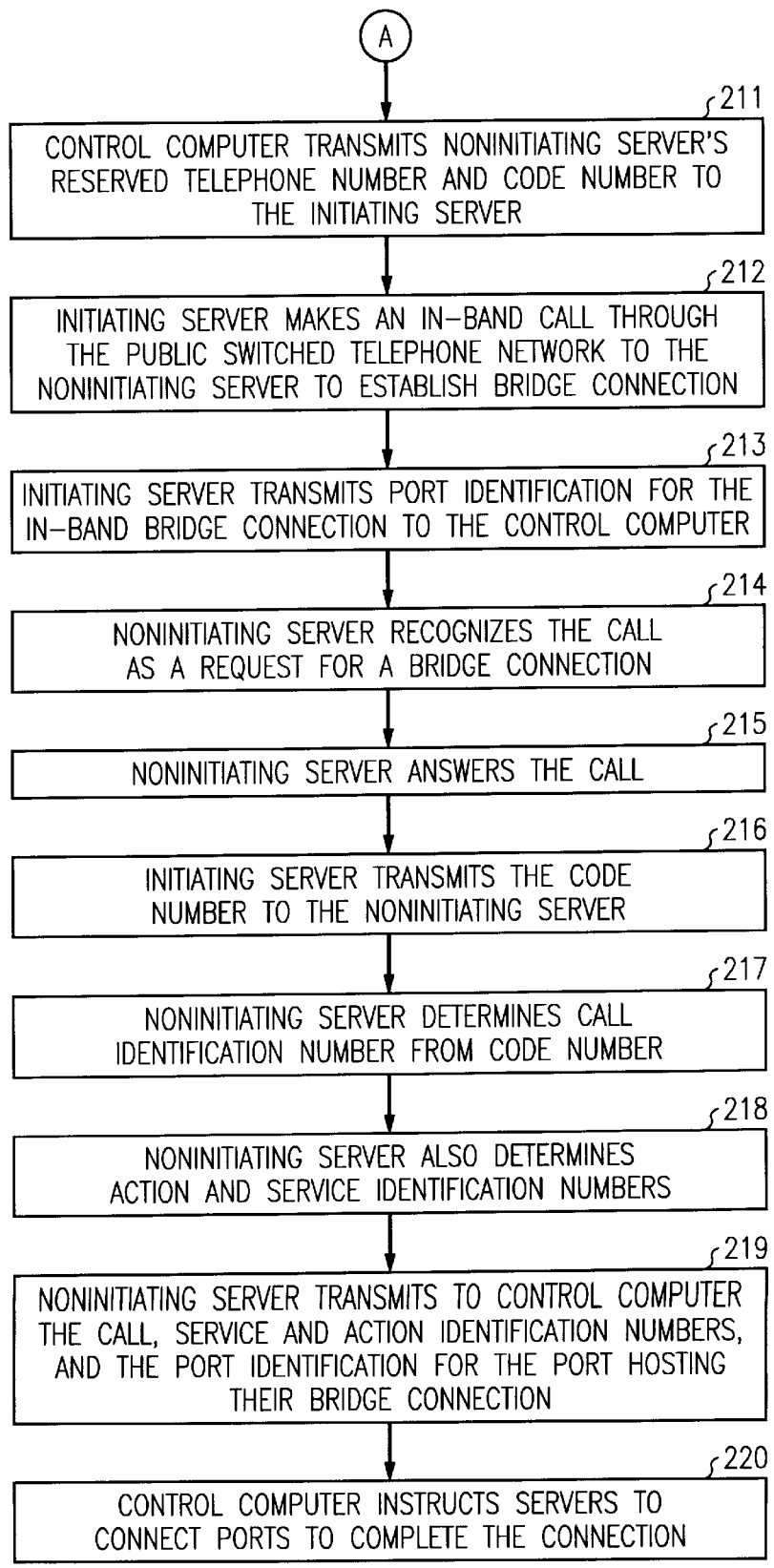

The system of the invention has been developed to connect such inter-server calls as will be described with reference to FIGS. 1 and 2. Each server in the AIN maintains at least one directory number that is reserved for bridge connections for inter-server connections (block 201). When a call is received at any server, that server assigns a 10 digit call identification number (selected from a set of 10 digit numbers assigned to that server by the control computer for this purpose) to that call that survives for the duration of that call's activity in the AIN (block 202). The call identification number is retained both at the control computer 14 and at the server handling the call. Thus, for the example described above, when the call from telephone 18 is received at server 10a, server 10a assigns a first 10 digit call identification number for that call and transmits that number to control computer 14. When the call from telephone 20 is received at server 10c, server 10c assigns a second 10 digit call identification number for that call and transmits that number to control computer 14. The 10 digit call identification numbers are associated in the memory of control computer 14 with a 10 digit subscriber identification number permanently assigned to each subscriber. Because in the present scenario both calls are sent to the AIN based on triggers for customer A, both call identification numbers are associated with the subscriber identification of customer A; however, in the illustrated scenario the second call identification number is not necessary for the operation of the system of the invention.

When server 10c attempts to complete the call from caller B to customer A, control computer 14 determines that customer A is connected to server 10a by comparing the subscriber information received from telephone 20 with the subscriber information stored in memory 15 that is associated with the call from telephone 18 (block 203). Control computer 14 informs server 10a of the existence of caller B's call and server 10a transmits an announcement to telephone 18 announcing the call from caller B (block 204). Customer A can either accept or reject the call from caller B by pressing appropriate buttons on telephone 18 or by speaking the appropriate response (block 205). If the call is rejected, the call from caller B is not connected to customer A and is directed to voice mail, terminated or otherwise processed as is known in the art (block 206). If the call from caller B is accepted by customer A, control computer 14 instructs either server 10a or server 10c to initiate a bridge connection (block 207). Either server hosting one of the calls to be connected can initiate the bridge connection and the selection of the actual server to initiate the bridge can be based on traffic conditions, server load or default designations. For purposes of explanation, assume that control computer selects server 10c (the initiating server) to initiate the bridge connection.

The control computer 14 requests from server 10a the telephone number, server 10a has reserved for bridge calls (block 208). The control computer 14 also transmits to server 10a the 5 digit service identification number, the 10 digit call identification number for the call about to be made by the initiating server, and the 10 digit action identification number it has assigned to the bridging activity (block 209). Server 10a, transmits the reserved telephone number and an associated two digit code number associated with the 5 digit service identification number, and 10 digit call identification number and the 10 digit action identification number to control computer 14 (block 210). The two digit code number is an arbitrary number used as a shorthand reference for the 5 digit service identification number, 10 digit call identification number and the 10 digit action identification number. The server 10a maintains a table correlating the 5 digit service identification number, 10 digit call identification number and 10 digit action identification number to the two digit code number. Control computer 14 transmits server 10a's reserved telephone number and the two digit code number to server 10c (block 211) and server 10c makes a standard in-band call through the public switched network to server 10a using server 10a's reserved telephone number (block 212). Server 10c also transmits the port number 23 of the port on server 10c hosting the bridge connection call to control computer 14 (block 213). Server 10a recognizes the call as a request for a bridge connection from the received dialed digits (i.e. the dialed digits are server 10a's reserved telephone number) (block 214). Server 10a answers the call from server 10c (block 215) and server 10c transmits the two digit code number to server 10a over the connection using in-band signaling (block 216).

Server 10a, using the two digit code number received from server 10c, queries its local data base to determine the call identification number associated with that code number (block 217). Server 10a also determines the 5 digit service identification number that identifies the AIN service being performed (i.e. single number reach) and the 10 digit action identification number that identifies the particular action being taken for a given call (block 218). Note, the action can change for a given call and that a call may have more than one action running concurrently. Moreover, the service identification number is fixed and identifies a process on the control computer where each service can handle many concurrent calls, each of which may be doing multiple actions. Once server 10a obtains this information, it transmits to control computer 14 the call identification number, service identification number and action identification number and the port identification for the port 25 hosting the bridge connection (block 219). Control computer then instructs server 10c to connect port 21 to port 23 and server 10a to connect port 19 to port 25 (block 220). Once these ports are connected by the respective servers, the connection between telephone 18 and telephone 20 is completed.

The invention has been described using the two digit code number as the number transmitted between servers to minimize the time it takes to set up the bridge connection. Alternatively, the 10 digit call identification, 10 digit action identification number and 5 digit service identification number could be used in place of the two digit code. The use of the two digit code number, however, speeds up call setup time by minimizing the number of digits transmitted in-band between the servers.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for connecting calls on physically distinct servers in an Advanced Intelligent Network (AIN), of a Public Switched Telephone Network (PSTN), comprising the steps of:

receiving a first call on a circuit switched connection from a caller on a first server;

receiving a second call on a circuit switched connection from a caller on a second server;

determining that the first call is to be connected to said second call;

transmitting a telephone number to said second server, said telephone number being reserved by said first server for inter-server connections;

said second server making a call to said first server using said telephone number to establish a circuit connection between the first and second servers over a public switched network;

said first and second server exchanging call identification information over said connection; and said first server and said second server associating said circuit connection with the first call and second call, respectively.

2. The method according to claim 1, further including the step of a control computer requesting the telephone number from the first server and providing the number to said second server.

3. The method of claim 1, further including the step of a control computer transmitting to said first server a call identification number for the second call.

4. The method of claim 1, further including the step of transmitting a code number correlated to a call identification number for the first call to said second server.

5. The method of claim 1, wherein the connection is an in-band call made through the public switched telephone network.

6. The method according to claim 1, wherein the step of determining includes the step of requesting acceptance of said connection by a customer.

7. The method of claim 1, wherein the step of associating said connection includes the steps of connecting said first and second calls to said connection at said first and second servers, respectively.

8. In a system comprising a plurality of switching systems of a Public Switched telephone Network (PSTN) connected as an Advanced Intelligent Network (AIN), said Advanced Intelligent Network (AIN), being a circuit network and including a plurality of servers connected to the switching systems over a plurality of trunks and a control computer connected to said servers, a method for connecting calls on said servers, comprising the steps of:

receiving a first call on a circuit switched connection from a caller on a first server;

receiving a second call on a circuit switched connection from a caller on a second server;

transmitting a call identification number from said control computer to said first server, said first server associating the call identification number with a code;

transmitting a telephone number to said control computer, said telephone number being reserved by said first server for inter-server bridge connections, and said code associated with the call identification number from said first server to the control computer;

transmitting said telephone number and said code to said second server;

said second server making a call to said first server using said telephone number to establish an inband circuit connection between the first and second servers via at least one of said switching systems;

transmitting said code from the second server to the first server over said connection;

said first server using said code and identifying said call identification number associated with that code;

said first and second servers connecting said first call and said second call to said connection, respectively, to complete the inter-server bridge circuit connection.

9. In a system comprising a plurality of switching systems of a Public Switched Telephone Network (PSTN) connected as an advanced intelligent network, said Advanced Intelligent Network (AIN), being a circuit network and, including a plurality of servers connected to the switching systems over a plurality of trunks and a control computer connected to said servers, a method for connecting calls on said servers comprising the steps of:

receiving a first call on a circuit switched connection from a caller on a first server;

receiving a second call on a circuit switched connection from a caller on a second server;

transmitting a call identification number from said control computer to said first server;

transmitting a telephone number to said control computer, said telephone number being reserved by said first server for inter-server bridge connections, and said call identification number from said first server to the control computer;

transmitting said telephone number and said call identification number to said second server;

said second server making a call to said first server using said telephone number to establish an inband circuit connection between the first and second servers via at least one of said switching systems;

transmitting said call identification number from the second server to the first server over said connection;

said first and second servers connecting said first call and said second call to said connection, respectively, to complete the inter-server circuit bridge connection.

* * * * *